United States Patent
Parker et al.

(10) Patent No.: US 12,556,180 B2
(45) Date of Patent: Feb. 17, 2026

(54) HOT CARRIER INJECTION HARDENED PHYSICALLY UNCLONABLE FUNCTION CIRCUIT

(71) Applicant: Intel Corporation, Santa Clara, CA (US)

(72) Inventors: Rachael Parker, Forest Grove, OR (US); Jyothi Bhaskarr Velamala, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 17/990,575

(22) Filed: Nov. 18, 2022

(65) Prior Publication Data

US 2023/0163761 A1    May 25, 2023

Related U.S. Application Data

(60) Provisional application No. 63/281,236, filed on Nov. 19, 2021.

(51) Int. Cl.
*H03K 17/687* (2006.01)
*H03K 19/20* (2006.01)
*G11C 11/412* (2006.01)

(52) U.S. Cl.
CPC ......... *H03K 17/6872* (2013.01); *H03K 19/20* (2013.01); *G11C 11/412* (2013.01)

(58) Field of Classification Search
CPC ... G11C 11/412; H03K 17/6872; H03K 19/20
See application file for complete search history.

(56) References Cited

U.S. PATENT DOCUMENTS

| | | | |
|---|---|---|---|
| 11,082,242 B2 * | 8/2021 | Lu | H04L 9/3278 |
| 11,321,459 B2 | 5/2022 | Shen et al. | |
| 11,720,672 B2 | 8/2023 | Shen et al. | |
| 2016/0217832 A1 | 7/2016 | Jayaraman et al. | |
| 2019/0130103 A1 | 5/2019 | Shen et al. | |
| 2019/0229933 A1 * | 7/2019 | Li | G11C 29/52 |
| 2019/0356314 A1 * | 11/2019 | Lu | H01L 23/576 |
| 2020/0105356 A1 | 4/2020 | Kulkarni et al. | |
| 2020/0106625 A1 | 4/2020 | Shen et al. | |
| 2020/0136840 A1 * | 4/2020 | Lee | H10D 89/10 |
| 2020/0313003 A1 * | 10/2020 | Shen | H10D 64/511 |

OTHER PUBLICATIONS

Balaji et al., "Design of a Delta Threshold Voltage Difference based fully Embedded Read Only Memory along with a Skew Sense Amplifier", 2019 4th International Conference on Recent Trends on Electronics, Information, Communication & Technology (RTEICT-2019), May 17-18, 2019, pp. 475-479.

(Continued)

*Primary Examiner* — Alexander H Taningco
(74) *Attorney, Agent, or Firm* — NICHOLSON DE VOS WEBSTER & ELLIOTT LLP

(57) ABSTRACT

Various embodiments provide apparatuses, systems, and methods for a hot carrier injection (HCI) physically unclonable function (PUF) circuit. For example, described herein is a HCI PUF circuit with n-type metal oxide semiconductor (NMOS) transistors and a Pi-shaped reset structure. Other embodiments may be described and claimed.

22 Claims, 9 Drawing Sheets

(56) References Cited

OTHER PUBLICATIONS

European Search Report and Search Opinion, EP App. No. 22202542.1, Mar. 27, 2023, 11 pages.
Non-Final Office Action, U.S. App. No. 17/706, 124, Apr. 14, 2025, 11 pages.
Requirement for Restriction/Election, U.S. App. No. 17/706, 124, Jan. 30, 2025, 6 pages.
1 Final Office Action, U.S. App. No. 17/706, 124, Sep. 19, 2025, 11 pages.

\* cited by examiner

HOT CARRIER INJECTION HARDENED PHYSICALLY UNCLONABLE FUNCTION CIRCUIT

CROSS REFERENCE TO RELATED APPLICATION

The present application claims priority to U.S. Provisional Patent Application No. 63/281,236, filed Nov. 19, 2021, which is hereby incorporated by reference herein.

FIELD

Embodiments of the present disclosure relate generally to the technical field of electronic circuits, and more particularly to physically unclonable function (PUF) circuits.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many electronic circuits include a physical unclonable function (PUF) circuit, e.g., for cryptography and/or other functions. Some System-on-Chips (SoCs) have been using memory elements (e.g., static random access memory (SRAM) or SA latch) for a PUF circuit, which suffer from high sensitivity to environmental conditions. Because of this, a large amount of error correction coding (ECC) is needed which is costly to store in non-volatile memory (NVM) and potentially leaks entropy making the solution less secure. Some SOCs use a third party oxide anti-fuse type PUF but that is not desirable for a few reasons.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

As discussed above, many PUF circuits use an SRAM or other memory element for a PUF circuit. An innovative PUF was described in U.S. patent application Ser. No. 16/234,348 (hereinafter "the '348 application"), which has a common inventor with the present application and is hereby incorporated by reference herein. The techniques of the '348 application use the hot carrier injection reliability mechanism to intentionally stress the PUFs in a manner that reinforces their natural variation, or to stress them in a manner that leverages them as a NVM element. Embodiments herein may provide improvements and other innovations over what was previously described in the '348 application.

For example, embodiments herein are based on unique properties of the HCI PUF, such as the circuit topology. Embodiments provide a PUF that has ~0% BER (or adjustable BER) that is ideally suited to secure root key generation because it can be 100% self-contained with no external helper data needed. The HCI PUF circuit may be cross-foundry portable. In addition, the HCI PUF can be further simplified for applications like unique ID for fuse replacement.

Unlike traditional memory PUFs which use CMOS logic, the memory PUF circuit described herein may use NMOS logic (e.g., for reasons that are further discussed below). This may result in an area that looks different from prior techniques due to diffusion types.

Figure 1:
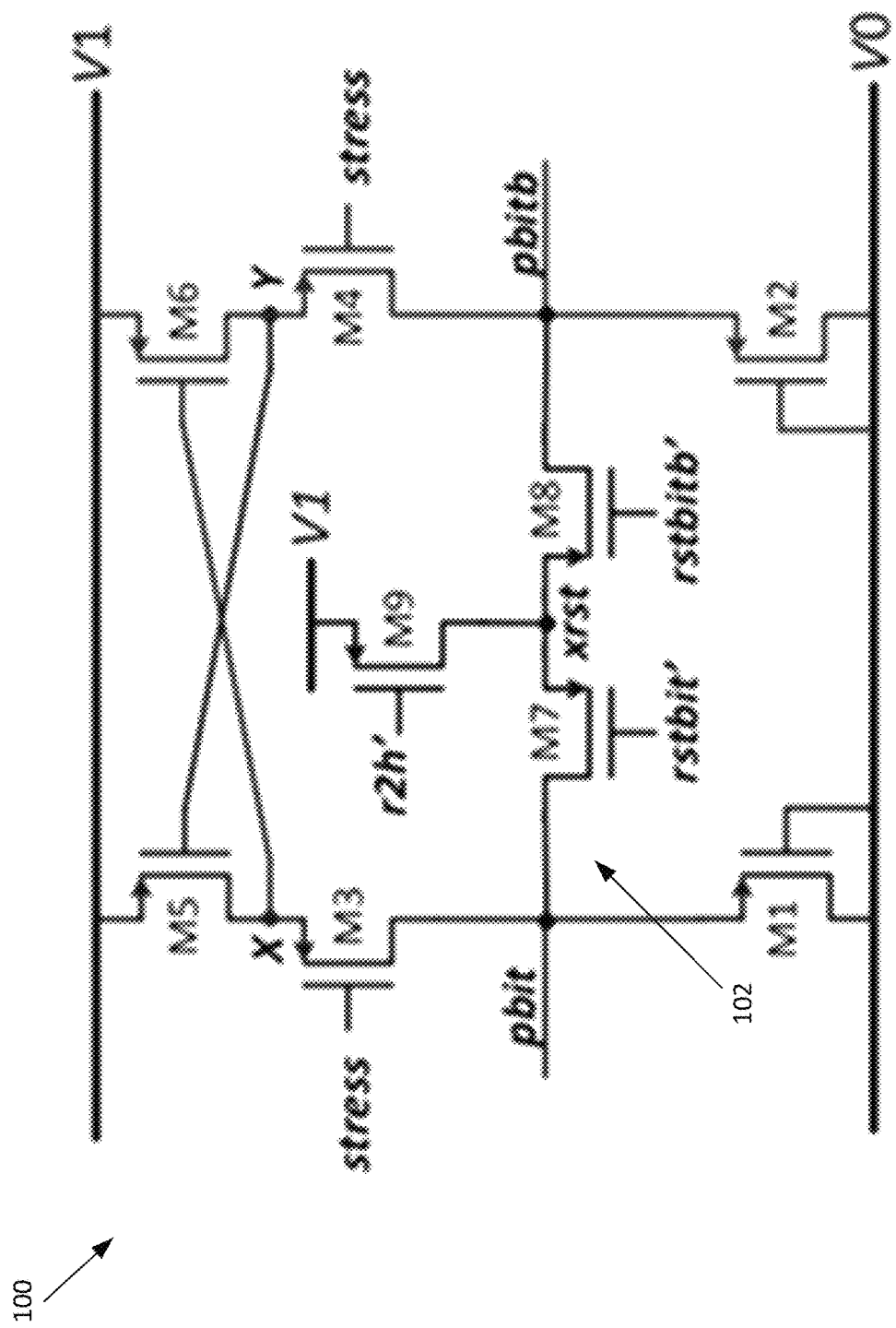
FIG. 1 illustrates a hot carrier injection (HCI) PUF circuit that includes only p-type metal-oxide-semiconductor (PMOS) transistors.
Figure 2:
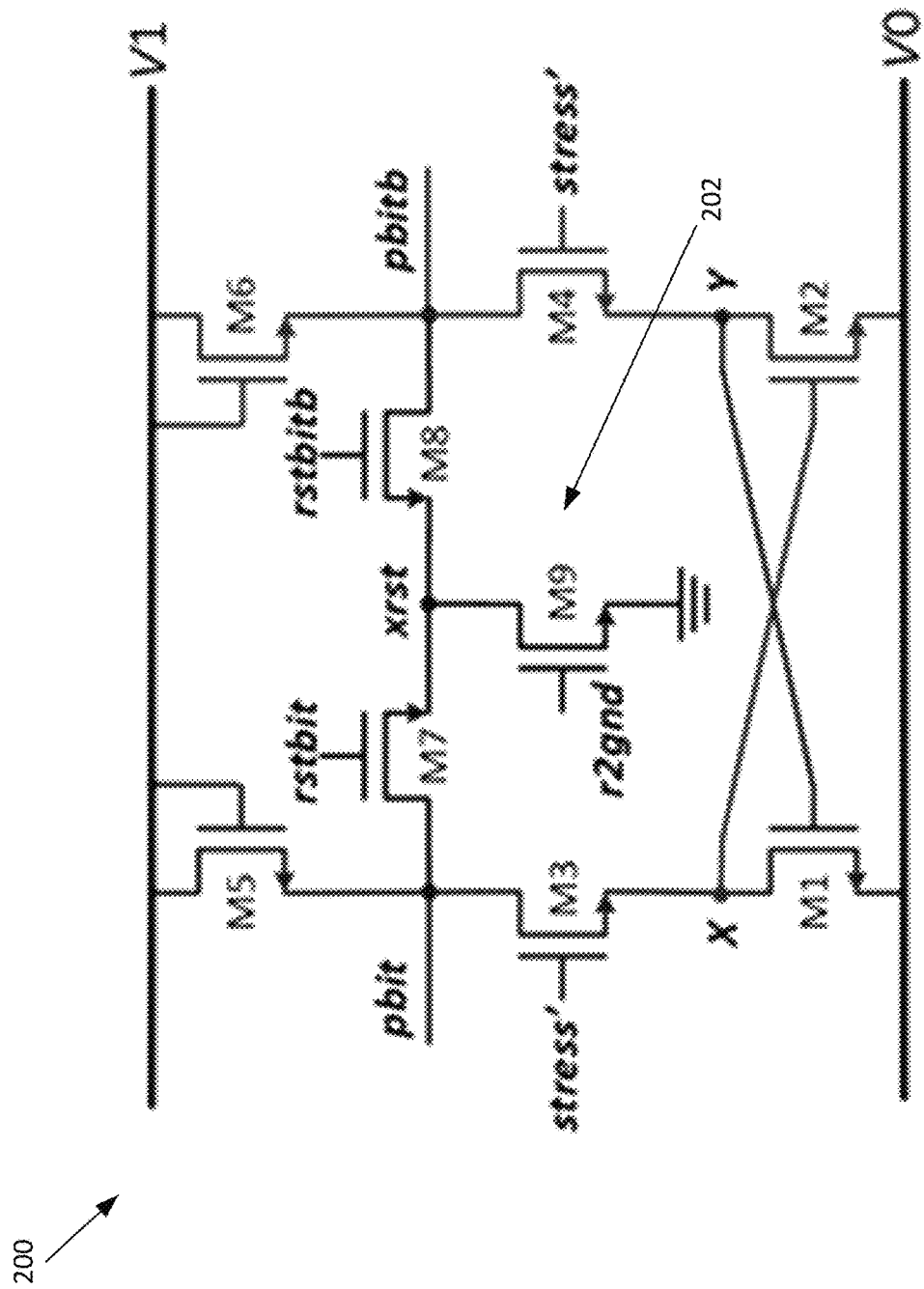
FIG. 2 illustrates a HCI PUF circuit that includes only n-type metal-oxide-semiconductor (NMOS) transistors.

FIG. 1 illustrates a PMOS only version of an HCI PUF circuit 100, as previously described by the present inventors. FIG. 2 illustrates the corresponding HCI PUF circuit 200 using NMOS transistors.

As shown in FIG. 1, the HCI PUF circuit 100 includes pbit node and a pbitb node that resolve to a logic value and an inverse of the logic value, respectively, when the HCI PUF circuit 100 is activated. The HCI PUF circuit 100 further includes a reset circuitry 102 that includes transistors M7, M8, and M9. The reset circuitry 102 may be referred to as having a "T-shaped" reset structure. Transistors M7 and M8 are coupled in series between the pbit node and the pbitb node, and coupled to one another at a reset node (xrst). Transistor M9 is coupled between the reset node (xrst) and a supply voltage V1. The transistors M7, M8, and M9 are controllable by respective control signals rstbit', rstbitb', and r2h' (received at their respective gate terminals) to reset the voltage level of the pbit node and pbitb node (e.g., to the voltage of the supply voltage V1).

The HCI PUF circuit 200 includes a similar reset circuitry 202 to the reset circuitry 102 of FIG. 1. The reset circuitry 202 includes a T-shaped reset structure, with transistors M7 and M8 coupled in series between the pbit node and the pbitb node, and transistor M9 coupled between the reset node xrst and ground.

Figure 3:
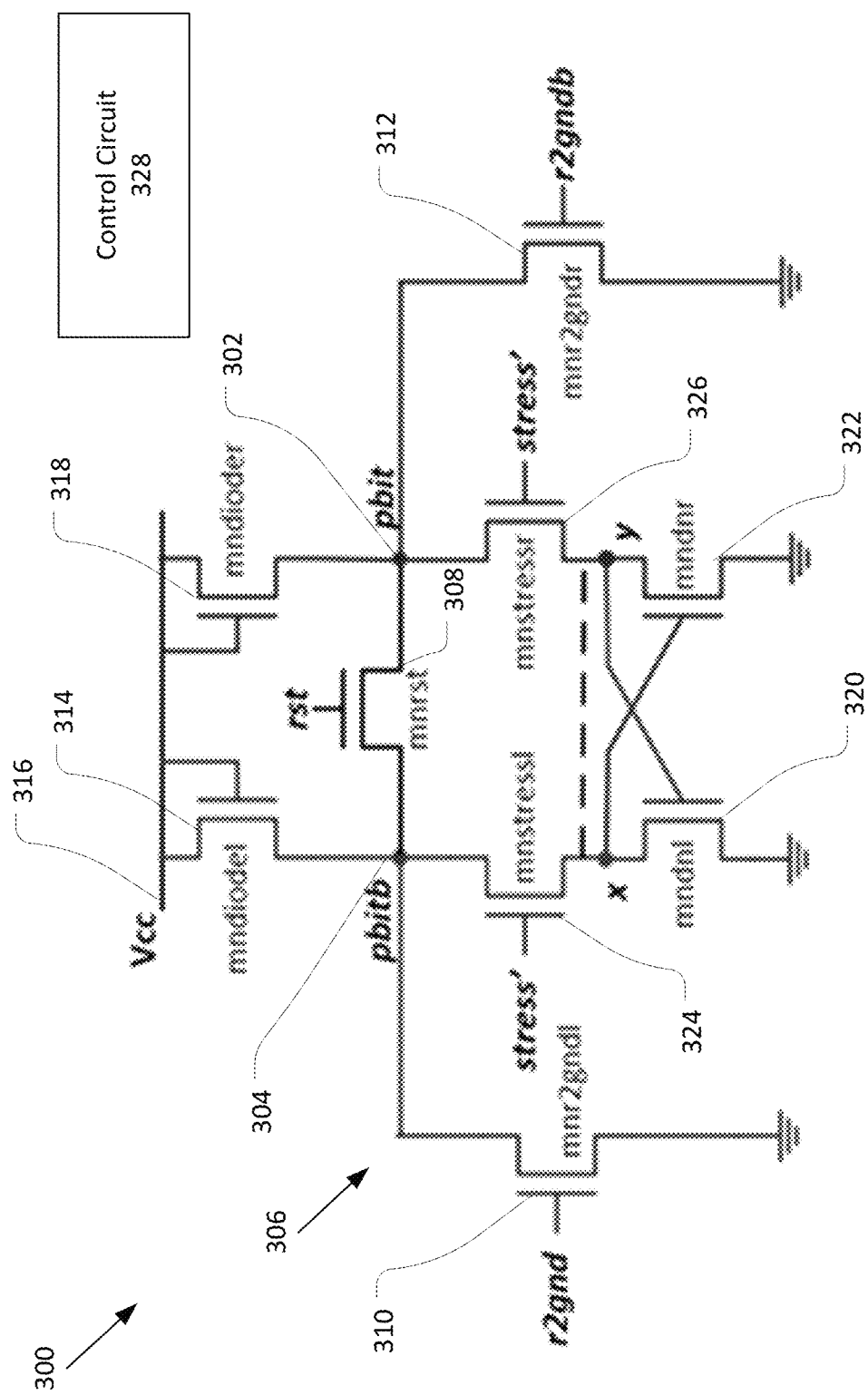
FIG. 3 illustrates a NMOS HCI PUF circuit with a Pi-shaped reset circuitry, in accordance with various embodiments.

Various embodiments herein may include a HCI PUF circuit that has a reset circuitry with a different reset structure. For example, the reset circuitry may include a "Pi-shaped" reset structure, as shown in FIG. 3 and further described below. The HCI PUF circuits and associated techniques described herein may enable the BER of the HCI PUF circuits to be lowered, e.g., via implemented stress. Furthermore, the HCI PUF circuits described herein may allow a denser and better matched layout.

FIG. 3 illustrates an example HCI PUF circuit 300 in accordance with various embodiments. In some embodiments, the HCI PUF circuit 300 may include all NMOS transistors. In other embodiments, one or more PMOS transistors may be included.

The HCI PUF circuit 300 may evaluate to a first logic value at a pbit node 302 and a second logic value at a pbitb node 304, where the second logic value is the inverse of the first logic value (e.g., the second logic value is a logic "1" when the first logic value is a logic "0", and the second logic value is a logic "0" when the first logic value is a logic "1"). The HCI PUF circuit 300 may include a reset circuitry 306 that includes a reset transistor 308 (mnrst), a first reset-to-ground transistor 310 (mnr2gndl), and a second reset-to-ground transistor 312 (mnr2gndr). The reset transistor 308 is coupled between the pbit node 302 and the pbitb node 304 and controlled by a reset signal (rst) received at its gate terminal. The first reset-to-ground transistor 310 is coupled between the pbitb node 304 and ground, and is controlled by a first reset-to-ground signal (r2gnd) received at its gate terminal. The second reset-to-ground transistor 312 is coupled between the pbit node 302 and ground, and is controlled by a second reset-to-ground signal (r2gndb) received at its gate terminal. The reset transistor 308, first reset-to-ground transistor 310, and second reset-to-ground transistor 312 may be turned on to reset the voltage level of both the pbit node 302 and the pbitb node 304 to ground. The reset transistor 308, first reset-to-ground transistor 310, and second reset-to-ground transistor 312 may thereafter be turned off, and the HCI PUF circuit 300 may be energized to cause it to evaluate.

The HCI PUF circuit 300 further includes a first diode-connected transistor 314 (mndiodel) coupled between a supply rail 316 (which receives a voltage Vcc) and the pbitb node 304, and a second diode-connected transistor 318 (mndioder) coupled between the supply rail 316 and the pbit node. The gate terminals of the first diode-connected transistor 314 and second diode-connected transistor 318 may be coupled to the supply rail 316. The HCI PUF circuit 300 further includes a first NMOS transistor 320 (mndnl) and a second NMOS transistor 322 (mndnr) which are cross-coupled with one another. The drain terminals of the first and second NMOS transistors 320 and 322 are coupled to ground, and the gate terminals are coupled to the respective source terminals of the other transistor. A first stress transistor 324 may be coupled between the first NMOS transistor 320 and the pbitb node 304, and a second stress transistor 326 may be coupled between the second NMOS transistor 322 and the pbit node 302.

When the HCI PUF circuit 300 is energized, the pbit node 302 and pbitb node 304 may evaluate to the first and second logic values, respectively, based on the contention between the first and second NMOS transistors 320 and 322. In embodiments, stress may be applied to the HCI PUF circuit 300 (e.g., via using stress transistors 324 and 326) to lower the BER of the HCI PUF circuit 300 (e.g., cause the HCI PUF to reliably evaluate to the same value). In some embodiments, the stress may be applied during manufacturing of the integrated circuit that includes HCI PUF circuit 300.

The circuit 300 may include a control circuit 328 to provide the respective control signals to the transistors of the HCI PUF circuit 300 and/or control the supply voltage on the supply rail 316. Accordingly, the control circuit 328 may control operation of the HCI PUF circuit 300, e.g., a read operation (in which the cell is energized to evaluate), a stress operation, a reset operation, and/or other operations as described herein.

Figure 4A:
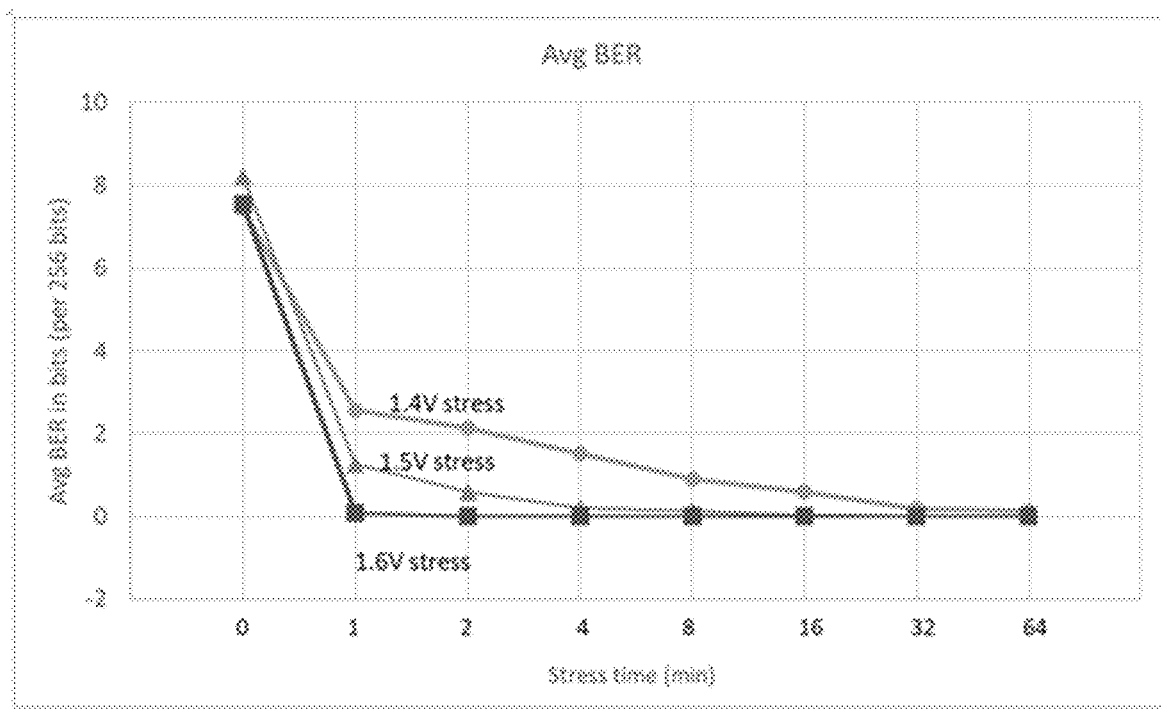
FIGS. 4A and 4B illustrate an average bit error rate (BER) and a maximum BER, respectively, with stress time for the PUF circuit of FIG. 3.
Figure 4B:
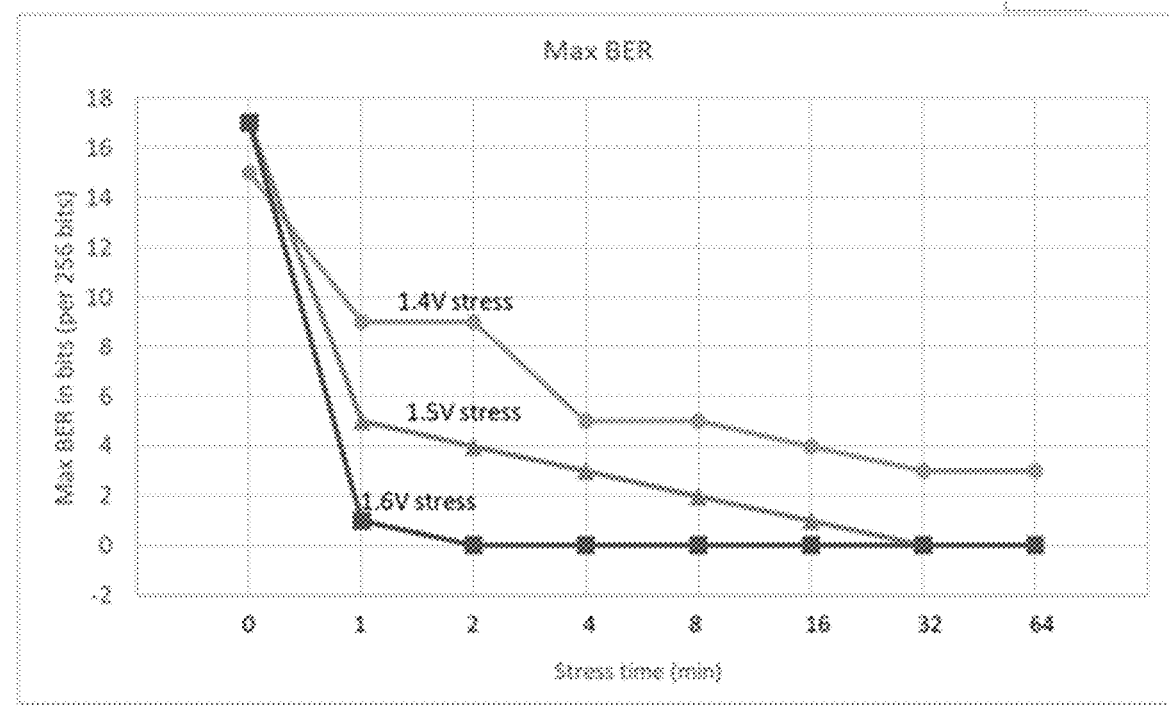

FIGS. 4A and 4B show the average BER and maximum BER, respectively, for the circuit 300 of FIG. 3 as a function of stress voltage and duration. It can be seen that BER can be lowered or driven to zero, enabling the BER of the HCI PUF circuit to be tuned as desired. This is important because it may be desired to stress the device enough to influence its stochastic output, but not so much that the device can be probed to reveal the PUF values (e.g., as is a concern with external oxide anti-fuse based PUFs).

Figure 5:
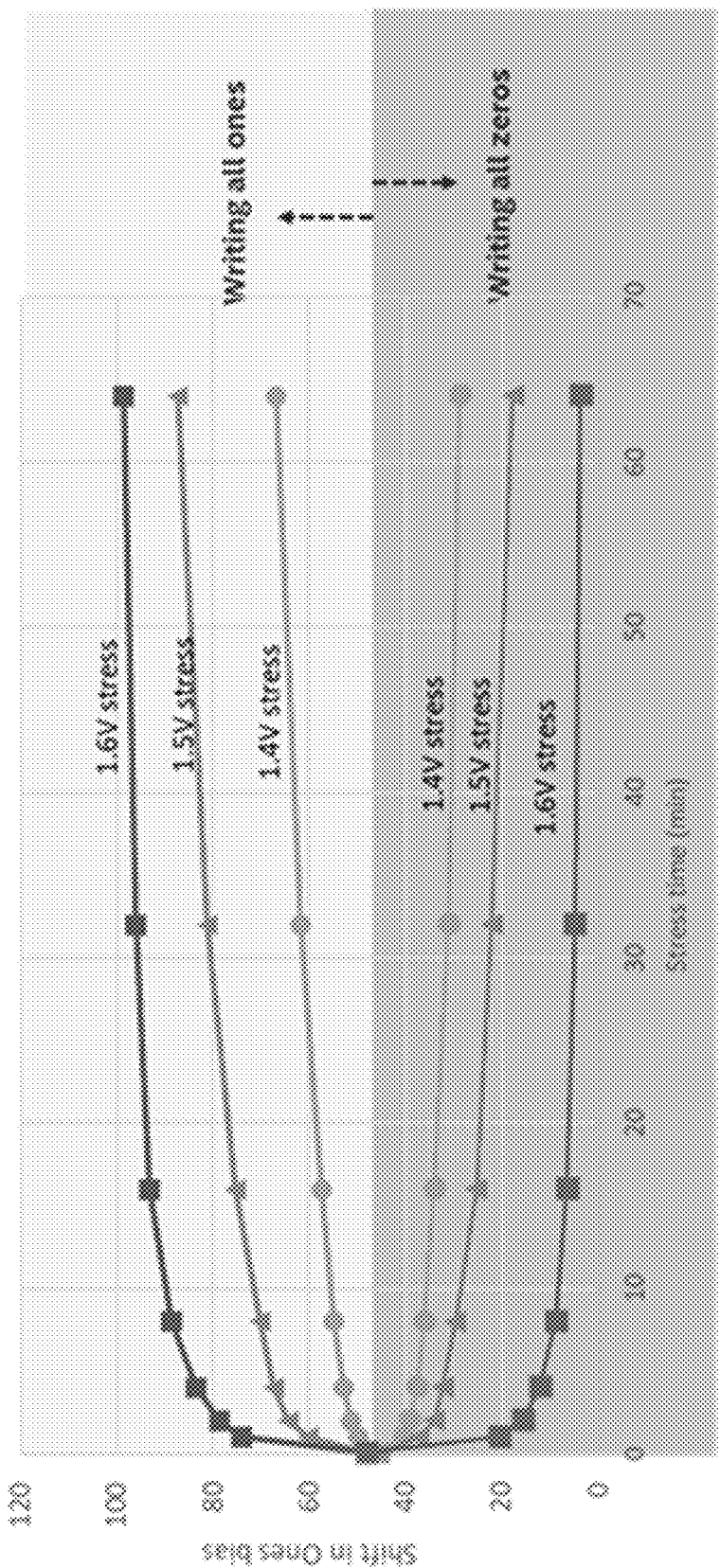
FIG. 5 illustrates an average and maximum BER with stress time for a fuse mode of the PUF circuit of FIG. 3.

In addition, FIG. 5 illustrates an example BER vs stress profile for the HCI PUF circuit 300 in "fuse mode." In fuse mode, the HCI PUF circuits 300 may be written to respective desired values. As shown, the PUF circuit can be written to a '1' or '0' regardless of its intrinsic variation, with a low (e.g., <5%) BER.

In some embodiments herein, non-minimum sized devices may be used for the HCI PUF circuits 300 that generate "fuse-mode" bits to further lower their BER. This will help because the manufacturing variation and variation in thermal noise will reduce, while the HCI stress will not.

Another application of the HCI PUF circuits described herein is for fuse replacement. Here, a unique PUF ID may be used to index configuration data that is stored off-die (e.g., in NVM).

Figure 6A:
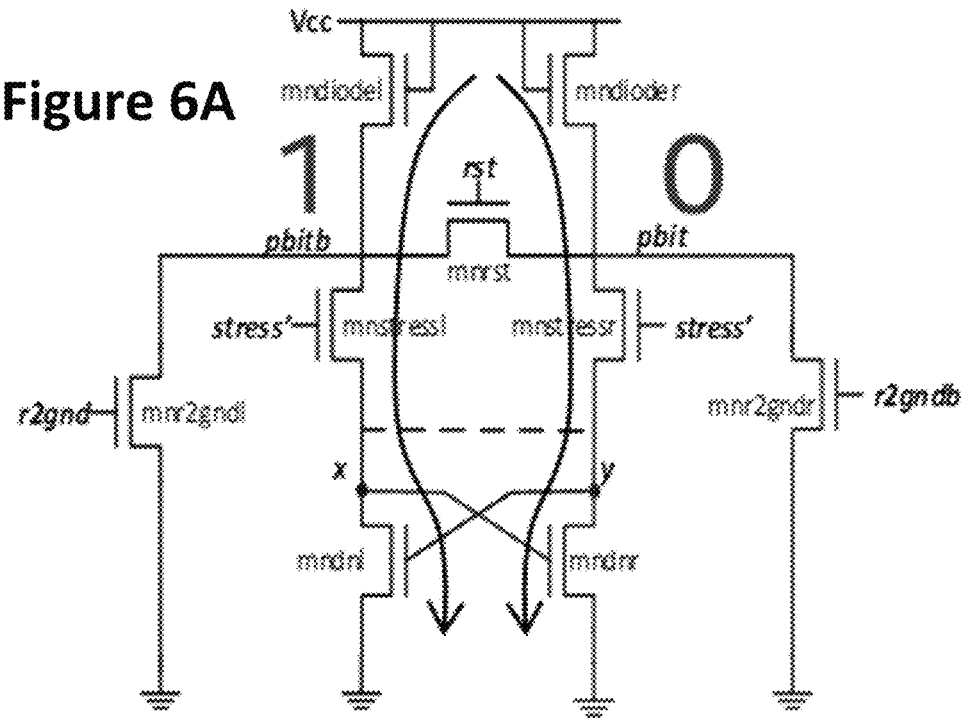
FIGS. 6A and 6B illustrate a read operation and a stress operation, respectively, for a fuse mode operation of a HCI PUF circuit, in accordance with various embodiments.
Figure 6B:
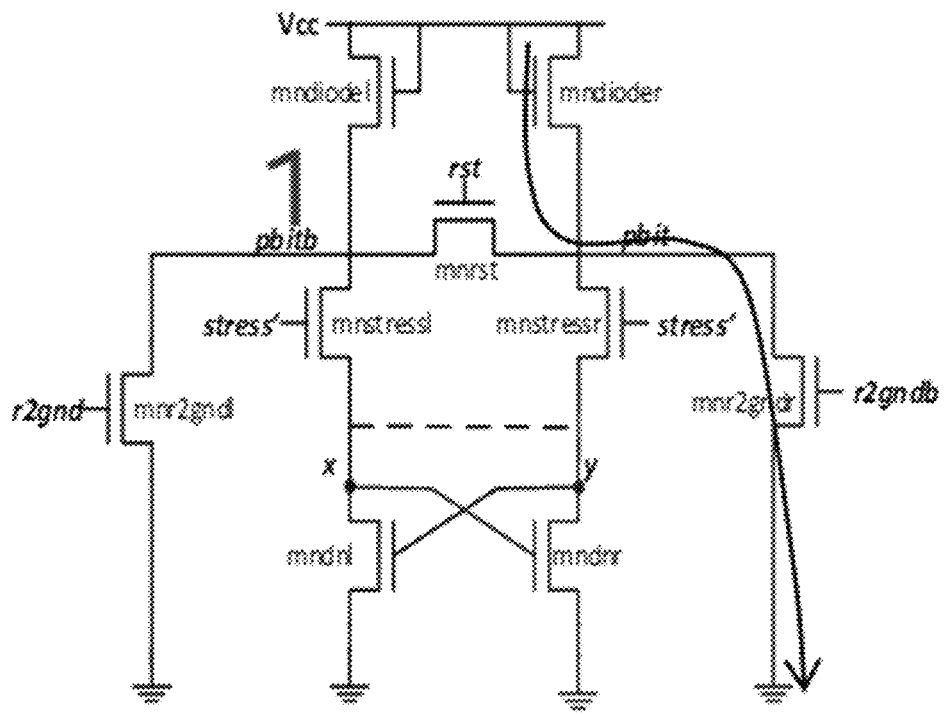

To illustrate, consider a PUF read and stress operation as shown in FIGS. 6A and 6B, respectively (or as described in the '348 application). In this example, assume that the transistors mdiodel and mndnr are cumulatively stronger than their opposites: mdioder and mndnl. Because of this, the output of the circuit is pbit=0 and pbitb=1. In order to reinforce this state, the PUF circuit of the '348 application would use a writeback feature to enable mnr2gndr which draws high current through the mndioder device weakening it with HCI degradation. This reinforces the natural variation.

Note that unlike the SRAM or SA latch type PUFs which require write back of the opposite value in order to BTI stress, the PUF cells described herein requires writeback of the same value before HCI stress. One improvement is HCI stress (no recovery) vs BTI stress (has recovery). Furthermore, in some embodiments herein, the writeback feature may be eliminated altogether. Accordingly, in some embodiments, the stress transistors may not be needed.

Figure 7:
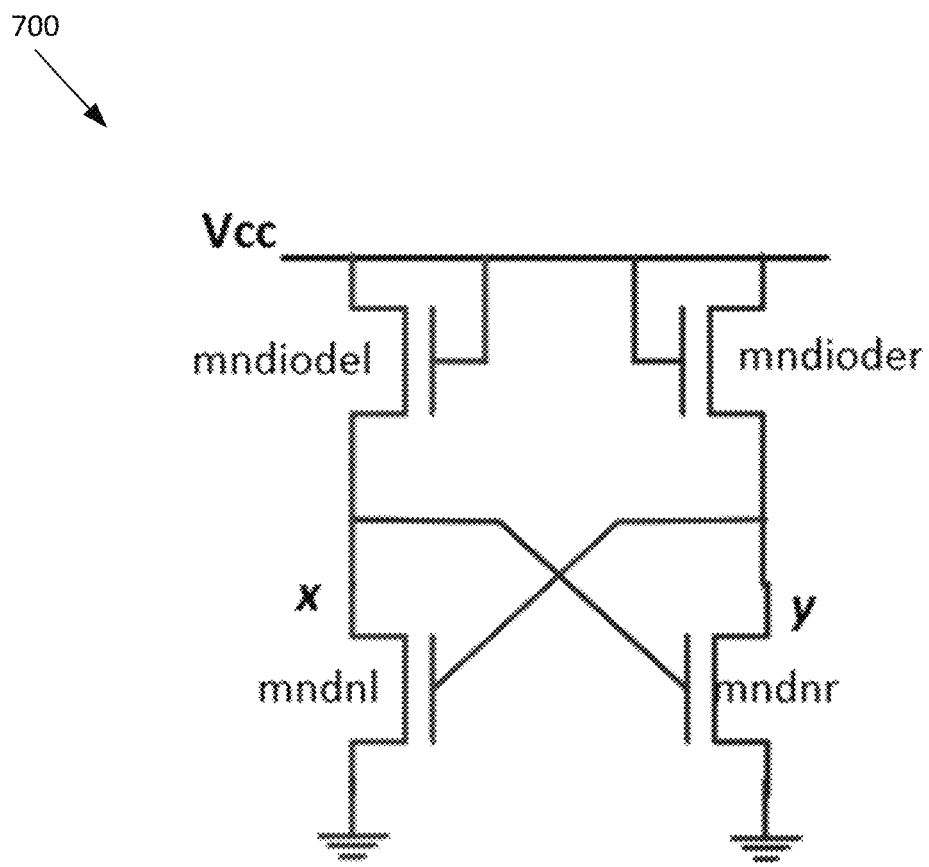
FIG. 7 illustrates a 4 transistor HCI PUF circuit in accordance with various embodiments.

For example, FIG. 7 illustrates an example 4-transistor (4-t) HCI PUF circuit 700 in accordance with various embodiments. In some embodiments, the circuit of FIG. 7 may correspond to an NMOS latch.

This circuit 700 is unique from a CMOS latch. For example, if the circuit 700 is energized such that it evaluates to a random value, the supply voltage (or a gated version) can subsequently be raised to stress the part, leaving it in its post-read state. No write back, TMV, etc is required. This means a small cell (e.g., close to SRAM for density) can be used, which requires a minimal post processing.

The PUF circuit/cell 700 of FIG. 7 is merely an example, and many different implementations are contemplated in accordance with various embodiments. For example, other types or configurations of NMOS latches may be used as a PUF cell, and/or additional features may be added to the PUF cell. For example, the circuit 700 may include reset circuitry similar to the reset circuitry 306 of circuit 300.

Figure 8:
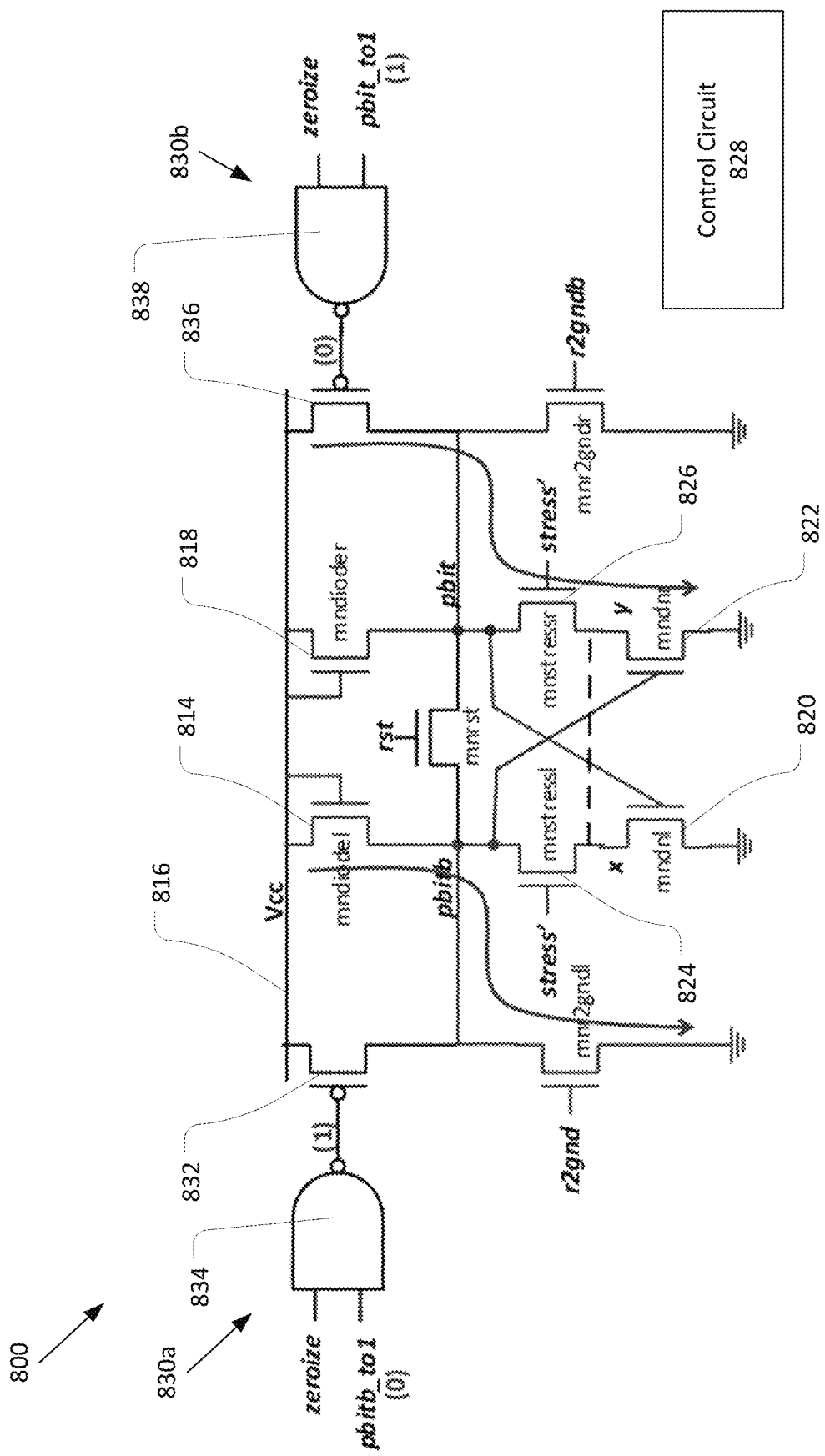
FIG. 8 illustrates a HCI PUF circuit with a zero-izer in accordance with various embodiments.

FIG. 8 illustrates another example of a PUF circuit 800 in accordance with various embodiments. The PUF circuit 800 of FIG. 8 includes a zero-izer circuitry 830a and 830b, which may be a requirement for certification of PUFs in the future. The PUF circuit 800 may be similar to circuit 300 of FIG. 300, except that PUF circuit 800 includes the zero-izer 830a-b. Additionally, in the circuit 800, the gate terminals of the NMOS transistors 820 and 822 may be cross-coupled to the pbit node 802 and pbitb node 804, respectively (e.g., above the stress transistors 826 and 824, respectively).

In embodiments, the zeroizer circuitry 830a-b may be used to force the first logic value of the pbit node 802 and the second logic value of the pbitb node 804 to have implemented values (e.g., pre-defined values). The zeroizer circuitry 830a may include a transistor 832 (e.g., a PMOS transistor) coupled between the supply rail 816 and the pbitb node 804 (e.g., in parallel with the diode-connected transistor 814), and a logic 834 with an output coupled to the gate terminal of the transistor 832. In some embodiments, the logic 834 may include a NAND gate with an output coupled to the gate terminal of the transistor 832, a first input to receive a zeroize enable signal (zeroize), and a second input to receive a signal (pbitb_to1) to set the implemented value of the first logic value. The zeroizer circuitry 830b may include a transistor 836 (e.g., a PMOS transistor) coupled between the supply rail and the pbit node 802 (e.g., in parallel with the diode-connected transistor 818), and a logic 838 with an output coupled to the gate terminal of the transistor 836. In some embodiments, the logic 838 may include a NAND gate with an output coupled to the gate terminal of the transistor 836, a first input to receive the zeroize enable signal (zeroize), and a second input to receive a signal (pbitb_to0) to set the implemented value of the first logic value. The zerioizer circuitry 830a-b and/or other components of the circuit 800 may be controlled by control circuit 828.

By moving the gate of the cross-coupled NMOS gain elements (transistors 820 and 822) above the stress isolation devices (stress transistors 824 and 826), opposite elements may be HCI stressed compared with the circuit 300. In some embodiments, this may be used to attempt to bias all PUFs to a '1' or '0' depending on the implemented polarity. In FIG. 8, pbit_to1 is set to 1 and pbitb_to1 is set to 0. In this example, the PUF circuit 800 would be stressed to make pbit=1 and pbitb=0.

In various embodiments, the PUF circuit described herein may be implemented in an integrated circuit (e.g., SoC) and/or other device to provide a unique ID. In some embodiments, the PUF circuits may be used in place of fuses, which may enable elimination of some or all fuses from the integrated circuit.

A PUF circuit may include a plurality of the PUF cells described herein (e.g., as depicted in FIG. 3 and/or FIG. 8) to generate respective bits of a PUF ID. In some embodiments, the PUF circuit may be used with a challenge-response authentication and/or other security scheme.

Figure 9:
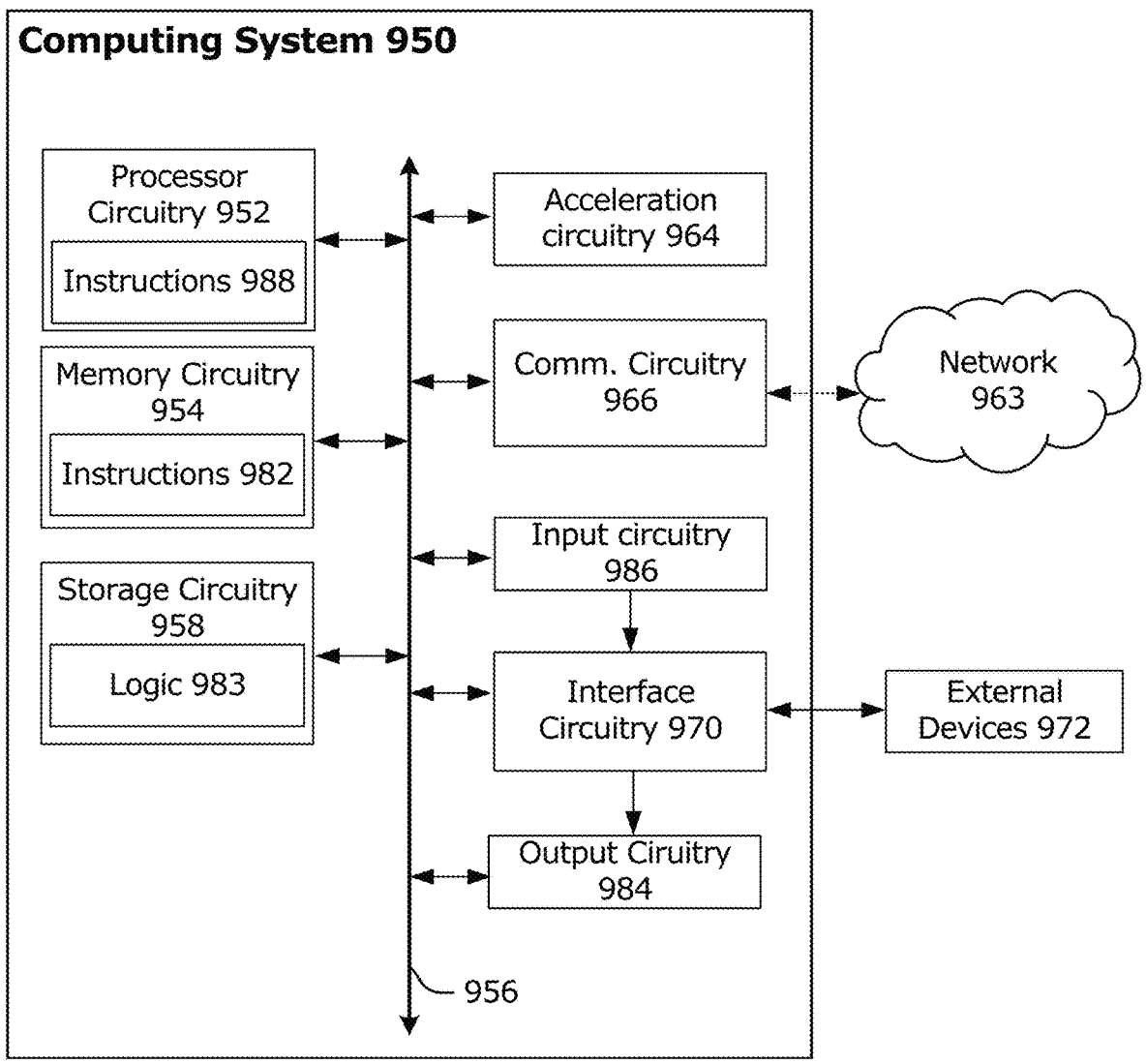
FIG. 9 illustrates an example system configured to employ the apparatuses and methods described herein, in accordance with various embodiments.

FIG. 9 illustrates an example of components that may be present in a computing system 950 for implementing the techniques described herein. The computing system 950 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 950, or as components otherwise incorporated within a chassis of a larger system. For one embodiment, at least one processor 952 may be packaged together with computational logic 982 and configured to practice aspects of various example embodiments described herein to form a System in Package (SiP) or a System on Chip (SoC).

The system 950 includes processor circuitry in the form of one or more processors 952. The processor circuitry 952 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 952 may include one or more hardware accelerators (e.g., same or similar to acceleration circuitry 964), which may be microprocessors, programmable processing devices (e.g., FPGA, ASIC, etc.), or the like. The one or more accelerators may include, for example, computer vision and/or deep learning accelerators. In some implementations, the processor circuitry 952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 952 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 952 may be coupled with or may include memory/storage and may be configured to execute instructions stored in the memory/storage to enable various applications or operating systems to run on the platform 950. The processors (or cores) 952 is configured to operate application software to provide a specific service to a user of the platform 950. In some embodiments, the processor(s) 952 may be a special-purpose processor(s)/controller(s) configured (or configurable) to operate according to the various embodiments herein.

As examples, the processor(s) 952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 952 may be a part of a system on a chip (SoC), System-in-Package (SiP), a multi-chip package (MCP), and/or the like, in which the processor(s) 952 and other components are formed into a single integrated circuit, or a single package, such as the Edison™ or Galileo™ SoC boards from Intel® Corporation. Other examples of the processor(s) 952 are mentioned elsewhere in the present disclosure.

The system 950 may include or be coupled to acceleration circuitry 964, which may be embodied by one or more artificial intelligence (AI)/machine learning (ML) accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 964 may comprise logic blocks or logic fabric and other interconnected resources that may be programmed (configured) to perform various functions, such as the procedures, methods, functions, etc. of the various embodiments discussed herein. In such implementations, the acceleration circuitry 964 may also include memory cells (e.g., EPROM, EEPROM, flash memory, static memory (e.g., SRAM, antifuses, etc.) used to store logic blocks, logic fabric, data, etc. in LUTs and the like.

In some implementations, the processor circuitry 952 and/or acceleration circuitry 964 may include hardware elements specifically tailored for machine learning and/or artificial intelligence (AI) functionality. In these implementations, the processor circuitry 952 and/or acceleration circuitry 964 may be, or may include, an AI engine chip that can run many different kinds of AI instruction sets once loaded with the appropriate weightings and training code. Additionally or alternatively, the processor circuitry 952 and/or acceleration circuitry 964 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 952 and/or acceleration circuitry 964 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 950 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 950 also includes system memory 954. Any number of memory devices may be used to provide for a given amount of system memory. As examples, the memory 954 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 954 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 954 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 958 provides persistent storage of information such as data, applications, operating systems and so forth. In an example, the storage 958 may be implemented via a solid-state disk drive (SSDD) and/or high-speed electrically erasable memory (commonly referred to as "flash memory"). Other devices that may be used for the storage 958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 954 and/or storage circuitry 958 may also incorporate three-dimensional (3D) cross-point (XPOINT) memories from Intel® and Micron®.

The memory circuitry 954 and/or storage circuitry 958 is/are configured to store computational logic 983 in the form of software, firmware, microcode, or hardware-level instructions to implement the techniques described herein. The computational logic 983 may be employed to store working copies and/or permanent copies of programming instructions, or data to create the programming instructions, for the operation of various components of system 900 (e.g., drivers, libraries, application programming interfaces (APIs), etc.), an operating system of system 900, one or more applications, and/or for carrying out the embodiments discussed herein. The computational logic 983 may be stored or loaded into memory circuitry 954 as instructions 982, or data to create the instructions 982, which are then accessed for execution by the processor circuitry 952 to carry out the functions described herein. The processor circuitry 952 and/or the acceleration circuitry 964 accesses the memory circuitry 954 and/or the storage circuitry 958 over the interconnect (IX) 956. The instructions 982 direct the processor circuitry 952 to perform a specific sequence or flow of actions, for example, as described with respect to flowchart(s) and block diagram(s) of operations and functionality depicted previously. The various elements may be implemented by assembler instructions supported by processor circuitry 952 or high-level languages that may be compiled into instructions 981, or data to create the instructions 981, to be executed by the processor circuitry 952. The permanent copy of the programming instructions may be placed into persistent storage devices of storage circuitry 958 in the factory or in the field through, for example, a distribution medium (not shown), through a communication interface (e.g., from a distribution server (not shown)), over-the-air (OTA), or any combination thereof.

The IX 956 couples the processor 952 to communication circuitry 966 for communications with other devices, such as a remote server (not shown) and the like. The communication circuitry 966 is a hardware element, or collection of hardware elements, used to communicate over one or more networks 963 and/or with other devices. In one example, communication circuitry 966 is, or includes, transceiver circuitry configured to enable wireless communications using any number of frequencies and protocols such as, for example, the Institute of Electrical and Electronics Engineers (IEEE) 802.11 (and/or variants thereof), IEEE 802.7.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 966 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 956 also couples the processor 952 to interface circuitry 970 that is used to connect system 950 with one or more external devices 972. The external devices 972 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 950, which are referred to as input circuitry 986 and output circuitry 984 in FIG. 9. The input circuitry 986 and output circuitry 984 include one or more user interfaces designed to enable user interaction with the platform 950 and/or peripheral component interfaces designed to enable peripheral component interaction with the platform 950. Input circuitry 986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 984 may be included to show information or otherwise convey information, such as sensor readings, actuator position(s), or other like information. Data and/or graphics may be displayed on one or more user interface components of the output circuitry 984. Output circuitry 984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 950. The output circuitry 984 may also include speakers and/or other audio emitting devices, printer(s), and/or the like. Additionally or alternatively, sensor(s) may be used as the input circuitry 984 (e.g., an image capture device, motion capture device, or the like) and one or more actuators may be used as the output device circuitry 984 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 950 may communicate over the IX 956. The IX 956 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 956 may be a proprietary bus, for example, used in a SoC based system.

The number, capability, and/or capacity of the elements of system 900 may vary, depending on whether computing system 900 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 900 may comprise one or more components of a data center, a desktop computer, a workstation, a laptop, a smartphone, a tablet, a digital camera, a smart appliance, a smart home hub, a network appliance, and/or any other device/system that processes data.

Some non-limiting examples of various embodiments are provided below.

Example 1 is a physically unclonable function (PUF) circuit comprising a PUF cell that includes: an n-type metal-oxide-semiconductor (NMOS) latch circuit to evaluate to a first logic value at a first node and a second logic value at a second node, wherein the second logic value is the inverse of the first logic value; a reset transistor coupled between the first node and the second node; a first reset-to-ground transistor coupled between the first node and ground; and a second reset-to-ground transistor coupled between the second node and ground.

Example 2 is the PUF circuit of example 1, wherein the NMOS latch circuit includes: a first NMOS transistor coupled between the first node and ground; a second NMOS transistor coupled between the second node and ground; a first diode-connected NMOS transistor coupled between a supply rail and the first node; and a second diode-connected NMOS transistor coupled between the supply rail and the second node.

Example 3 is the PUF circuit of example 2, wherein the PUF cell further includes: a first stress transistor coupled between the first node and the first NMOS transistor; and a second stress transistor coupled between the second node and the second NMOS transistor.

Example 4 is the PUF circuit of example 3, wherein a gate terminal of the first NMOS transistor is coupled to a source terminal of the second NMOS transistor and a gate terminal of the second NMOS transistor is coupled to a source terminal of the first NMOS transistor.

Example 5 is the PUF circuit of example 3, wherein a gate terminal of the first NMOS transistor is coupled to the second node and a gate terminal of the second NMOS transistor is coupled to the first node.

Example 6 is the PUF circuit of example 1-5, further comprising a zero-izer circuit to force the first logic value and the second logic value to implemented values.

Example 7 is the PUF circuit of example 6, wherein the zero-izer circuit includes: a p-type metal-oxide-semiconductor (PMOS) transistor coupled between the first node and the supply rail; and a NAND gate with an output coupled to a gate terminal of the PMOS transistor, a first input to receive a zeroize enable signal, and a second input to set the implemented value of the first logic value.

Example 8 is the PUF circuit of example 2, 6, or 7, wherein the first NMOS transistor is directly coupled to the first diode-connected NMOS transistor at the first node, and the second NMOS transistor is directly coupled to the second diode-connected NMOS transistor at the second node.

Example 9 is the PUF circuit of example 1-8, further comprising a control circuit to energize the PUF cell to evaluate to the first and second logic values, and subsequently raise a supply voltage on the supply rail.

Example 10 is an apparatus comprising a physically unclonable function (PUF) cell that includes: a first n-type metal-oxide semiconductor (NMOS) transistor coupled between a first node and ground; a second NMOS transistor coupled between a second node and ground, wherein a gate terminal of the first NMOS transistor is coupled to the second node and a gate terminal of the second NMOS transistor is coupled to the first node; a third NMOS transistor coupled between a supply rail and the first node; and a fourth NMOS transistor coupled between the supply rail and the second node, wherein gate terminals of the third and fourth NMOS transistors are coupled to the supply rail. The apparatus further comprises control circuitry coupled to the PUF cell, the control circuitry to: provide a supply voltage to the supply rail with a first voltage level, the supply voltage to energize the PUF cell to enter an evaluated state with a first logic value at the first node and a second logic value at the second node, wherein the second logic value is the inverse of the first logic value; and subsequently raise the supply voltage to a second voltage level that is higher than the first voltage level while the PUF cell remains in the evaluated state.

Example 11 is the apparatus of example 10, wherein the first NMOS transistor is directly coupled to the third NMOS transistor at the first node, and the second NMOS transistor is directly coupled to the fourth NMOS transistor at the second node.

Example 12 is the apparatus of example 10 or 11, wherein the PUF cell further includes: a reset transistor coupled between the first node and the second node; a first reset-to-ground (r2gnd) transistor coupled between the first node and ground; and a second r2gnd transistor coupled between the second node and ground.

Example 13 is the apparatus of example 10-12, further comprising a zero-izer circuit to force the first logic value and the second logic value to implemented values.

Example 14 is the apparatus of example 13, wherein the zero-izer circuit includes: a p-type metal-oxide-semiconductor (PMOS) transistor coupled between the first node and the supply rail; and a NAND gate with an output coupled to a gate terminal of the PMOS transistor, a first input to receive a zeroize enable signal, and a second input to set the implemented value of the first logic value.

Example 15 is a computer system comprising an integrated circuit that includes: one or more processors; a physically unclonable function (PUF) circuit; a memory coupled to the one or more processors; and a communication interface coupled to the one or more processors. The PUF circuit includes an array of PUF cells, wherein individual PUF cells of the array of PUF cells include: a latch circuit to evaluate to a first logic value at a first node and a second logic value at a second node, wherein the second logic value is the inverse of the first logic value; a reset transistor coupled between the first node and the second node; a first reset-to-ground transistor coupled between the first node and ground; and a second reset-to-ground transistor coupled between the second node and ground, wherein gate terminals of the first and second r2gnd transistors are to receive a r2gnd control signal.

Example 16 is the computer system of example 15, wherein the latch circuit includes: a first n-type transistor coupled between a first node and ground; a second n-type transistor coupled between a second node and ground; a first diode-connected n-type transistor coupled between a supply rail and the first node; and a second diode-connected n-type transistor coupled between the supply rail and the second node.

Example 17 is the computer system of example 16, wherein the individual PUF cells further include: a first stress transistor coupled between the first node and the first n-type transistor; and a second stress transistor coupled between the second node and the second n-type transistor.

Example 18 is the computer system of example 17, wherein a gate terminal of the first n-type transistor is coupled to a source terminal of the second n-type transistor and a gate terminal of the second n-type transistor is coupled to a source terminal of the first n-type transistor.

Example 19 is the computer system of example 17, wherein a gate terminal of the first n-type transistor is coupled to the second node and a gate terminal of the second n-type transistor is coupled to the first node.

Example 20 is the computer system of example 16, wherein the first n-type transistor is directly coupled to the first diode-connected n-type transistor at the first node, and the second n-type transistor is directly coupled to the second diode-connected n-type transistor at the second node.

Example 21 is the computer system of example 15, wherein the PUF cell further includes a zero-izer circuit to force the first logic value and the second logic value to implemented values.

Example 22 is the computer system of example 21, wherein the zero-izer circuit includes: a p-type transistor coupled between the first node and the supply rail; and a NAND gate with an output coupled to a gate terminal of the p-type transistor, a first input to receive an enable signal, and a second input to set the implemented value of the first logic value.

Example 23 is the computer system of example 15-22, wherein the integrated circuit further includes a control circuit to energize the PUF cells to evaluate to the respective first and second logic values, and subsequently raise a supply voltage on the supply rail.

In the preceding detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A physically unclonable function (PUF) circuit comprising a PUF cell that includes:
    an n-type metal-oxide-semiconductor (NMOS) latch circuit to evaluate to a first logic value at a first node and a second logic value at a second node, wherein the second logic value is the inverse of the first logic value;
    a reset transistor coupled between the first node and the second node;
    a first reset-to-ground transistor coupled between the first node and ground; and
    a second reset-to-ground transistor coupled between the second node and ground.

2. The PUF circuit of claim 1, wherein the NMOS latch circuit includes:
    a first NMOS transistor coupled between the first node and ground;
    a second NMOS transistor coupled between the second node and ground;
    a first diode-connected NMOS transistor coupled between a supply rail and the first node; and
    a second diode-connected NMOS transistor coupled between the supply rail and the second node.

3. The PUF circuit of claim 2, wherein the first NMOS transistor is directly coupled to the first diode-connected NMOS transistor at the first node, and the second NMOS transistor is directly coupled to the second diode-connected NMOS transistor at the second node.

4. The PUF circuit of claim 2, wherein the PUF cell further includes:
    a first stress transistor coupled between the first node and the first NMOS transistor; and
    a second stress transistor coupled between the second node and the second NMOS transistor.

5. The PUF circuit of claim 4, wherein a gate terminal of the first NMOS transistor is coupled to a source terminal of the second NMOS transistor and a gate terminal of the second NMOS transistor is coupled to a source terminal of the first NMOS transistor.

6. The PUF circuit of claim 4, wherein a gate terminal of the first NMOS transistor is coupled to the second node and a gate terminal of the second NMOS transistor is coupled to the first node.

7. The PUF circuit of claim 6, further comprising a zero-izer circuit to force the first logic value and the second logic value to implemented values.

8. The PUF circuit of claim 7, wherein the zero-izer circuit includes:
    a p-type metal-oxide-semiconductor (PMOS) transistor coupled between the first node and the supply rail; and
    a NAND gate with an output coupled to a gate terminal of the PMOS transistor, a first input to receive a zeroize enable signal, and a second input to set the implemented value of the first logic value.

9. The PUF circuit of claim 1, further comprising a control circuit to energize the PUF cell to evaluate to the first and second logic values, and subsequently raise a supply voltage on the supply rail.

10. An apparatus comprising:
    a physically unclonable function (PUF) cell that includes:
        a first n-type metal-oxide semiconductor (NMOS) transistor coupled between a first node and ground;

a second NMOS transistor coupled between a second node and ground, wherein a gate terminal of the first NMOS transistor is coupled to the second node and a gate terminal of the second NMOS transistor is coupled to the first node;

a third NMOS transistor coupled between a supply rail and the first node;

a fourth NMOS transistor coupled between the supply rail and the second node, wherein gate terminals of the third and fourth NMOS transistors are coupled to the supply rail, a reset transistor coupled between the first node and the second node; and a first reset-to-ground (r2gnd) transistor coupled between the first node and ground; and a second r2gnd transistor coupled between the second node and ground; and control circuitry coupled to the PUF cell, the control circuitry to:

provide a supply voltage to the supply rail with a first voltage level, the supply voltage to energize the PUF cell to enter an evaluated state with a first logic value at the first node and a second logic value at the second node, wherein the second logic value is the inverse of the first logic value; and subsequently raise the supply voltage to a second voltage level that is higher than the first voltage level while the PUF cell remains in the evaluated state.

11. The apparatus of claim 10, wherein the first NMOS transistor is directly coupled to the third NMOS transistor at the first node, and the second NMOS transistor is directly coupled to the fourth NMOS transistor at the second node.

12. The apparatus of claim 10, further comprising a zero-izer circuit to force the first logic value and the second logic value to implemented values.

13. The apparatus of claim 12, wherein the zero-izer circuit includes:

a p-type metal-oxide-semiconductor (PMOS) transistor coupled between the first node and the supply rail; and a NAND gate with an output coupled to a gate terminal of the PMOS transistor, a first input to receive a zeroize enable signal, and a second input to set the implemented value of the first logic value.

14. A computer system comprising:

an integrated circuit that includes:

one or more processors;

a physically unclonable function (PUF) circuit that includes an array of PUF cells, wherein individual PUF cells of the array of PUF cells include:

a latch circuit to evaluate to a first logic value at a first node and a second logic value at a second node, wherein the second logic value is the inverse of the first logic value;

a reset transistor coupled between the first node and the second node;

a first reset-to-ground (r2gnd) transistor coupled between the first node and ground; and a second reset-to-ground (r2gnd) transistor coupled between the second node and ground, wherein gate terminals of the first and second r2gnd transistors are to receive a r2gnd control signal;

a memory coupled to the one or more processors; and a communication interface coupled to the one or more processors.

15. The computer system of claim 14, wherein the latch circuit includes:

a first n-type transistor coupled between a first node and ground;

a second n-type transistor coupled between a second node and ground;

a first diode-connected n-type transistor coupled between a supply rail and the first node; and a second diode-connected n-type transistor coupled between the supply rail and the second node.

16. The computer system of claim 15, wherein the individual PUF cells further include:

a first stress transistor coupled between the first node and the first n-type transistor; and a second stress transistor coupled between the second node and the second n-type transistor.

17. The computer system of claim 16, wherein a gate terminal of the first n-type transistor is coupled to a source terminal of the second n-type transistor and a gate terminal of the second n-type transistor is coupled to a source terminal of the first n-type transistor.

18. The computer system of claim 16, wherein a gate terminal of the first n-type transistor is coupled to the second node and a gate terminal of the second n-type transistor is coupled to the first node.

19. The computer system of claim 15, wherein the first n-type transistor is directly coupled to the first diode-connected n-type transistor at the first node, and the second n-type transistor is directly coupled to the second diode-connected n-type transistor at the second node.

20. The computer system of claim 14, wherein the PUF cell further includes a zero-izer circuit to force the first logic value and the second logic value to implemented values.

21. The computer system of claim 20, wherein the zero-izer circuit includes:

a p-type transistor coupled between the first node and the supply rail; and a NAND gate with an output coupled to a gate terminal of the p-type transistor, a first input to receive an enable signal, and a second input to set the implemented value of the first logic value.

22. The computer system of claim 14, wherein the integrated circuit further includes a control circuit to energize the PUF cells to evaluate to the respective first and second logic values, and subsequently raise a supply voltage on the supply rail.

* * * * *